Dec. 24, 1957  W. JONES  2,817,550
WIRE STAYS
Filed May 14, 1953
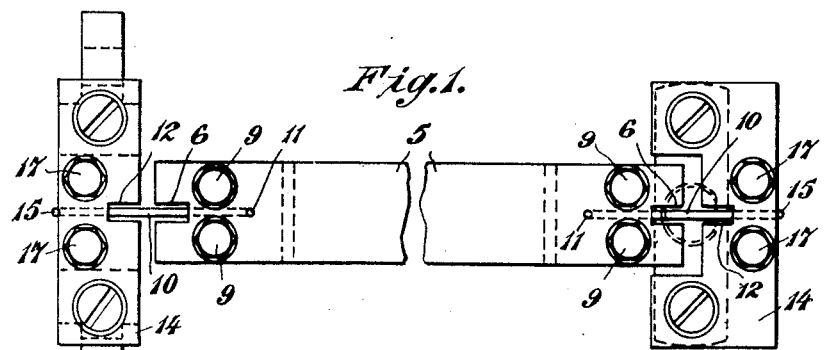
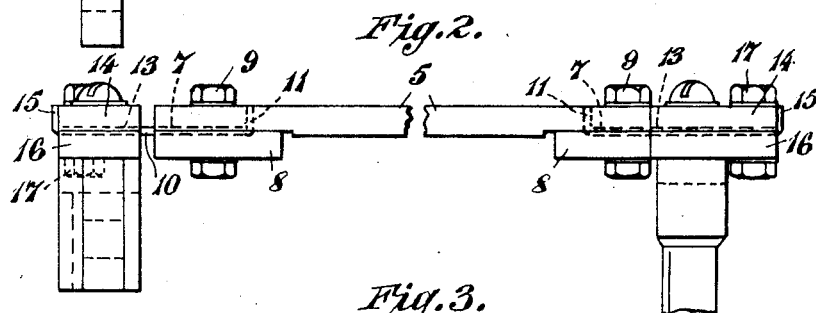
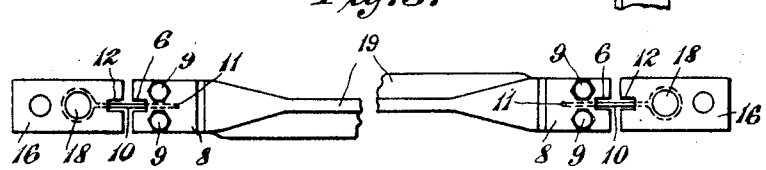
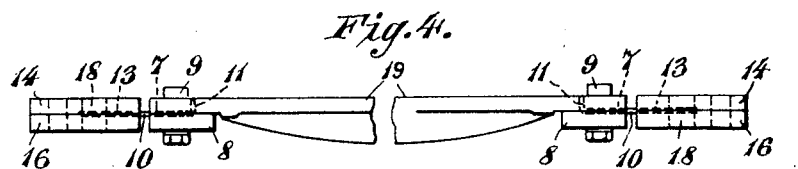
INVENTOR
WILLIAM JONES
BY Henninger and Pillans
ATTORNEYS

United States Patent Office 2,817,550
Patented Dec. 24, 1957

2,817,550

WIRE STAYS

William Jones, Birmingham, England, assignor to W. & T. Avery Limited, Birmingham, England, a British company Application May 14, 1953, Serial No. 354,929

6 Claims. (Cl. 287—86)

This invention has reference to improvements in stays for use in connection with weighing scales or other lever apparatus and has for its main object to produce what is generally termed a French stay for incorporation in a weighing scale embodying the Roberval system, but the stay may be utilized for other purposes say to prevent undue rocking or swinging motion of a weigh hopper, or incorporated in the mechanism of a testing machine.

It is known practice in this connection to use flexible steel or other metallic ribbons as the whole or part of the stay but it is found in practice that a stay so constructed or fitted has caused errors due to misalignment when incorporated in sensitive weighing mechanism.

The object of the present invention is to produce a stay wherein wire is employed as the flexible part of the connecting member, the stay being of robust construction and adapted to be incorporated in the scale or other mechanism so as to ensure a sensitive connection between the ends and the stay of the part or parts to be associated therewith.

The invention consists of a stay for use in a weighing scale or other lever apparatus characterised by a thin flexible wire connection between the end or ends of the stay and the associated part or parts of the weighing scale or other lever apparatus, the said wire being adapted to be definitely located and rigidly clamped or affixed to the stay and to the part or parts to be associated therewith.

Embodiments of the present invention will now be described in their application to weighing apparatus and with reference to the accompanying drawings, in which:

Figure 1 is a plan of one form of stay in accordance with the present invention.

Figure 2 is a side elevation of the stay seen in Figure 1.

Figure 3 is a plan from below of a modified stay in accordance with the present invention, and Figure 4 is a side elevation of the stay seen in Figure 3.

According to the embodiment illustrated in Figures 1 and 2 a stay to be incorporated in the Roberval system of a weighing scale has a body formed as a flat rectangular bar 5 slotted as at 6 and provided with grooves extending from said slots on one side of said bar as indicated by reference numeral 7 at each end and provided with a detachable clamping plate 8 which is adapted to be connected adjacent the ends of the bar by means of pairs of bolts and nuts 9; the clamping plates 8 being slotted and grooved corresponding to the bar whereby the slots will be aligned and the grooves positioned in cooperating relation when the parts are connected to the bar as shown in Figs. 1 and 2. Located within the said slots and grooves is the inner half of a cold drawn high tensile round wire 10 of marked flexibility, the inner end portions of each wire being cranked upwardly and located within a transverse or vertical hole 11 in the bar 5 whereby an effective anchorage of this end of the wire is attained with the aid of a clamping plate 8. The outer or other half of the wire 10 which is of similar configuration to the inner half is located within a horizontal slot 12 and groove 13 formed in or through a bearing plate 14 to which a leg of the Roberval system of weighing mechanism is connected, the outer end of the wire 10 being cranked upwardly at 15 to engage the outer edge of the said bearing plate. This half of the wire 10 is located and clamped in position in a somewhat similar manner to that already described with reference to the stay by means of a correspondingly slotted and grooved clamping plate 16 and pairs of bolts and nuts 17.

The wires thus located and rigidly positioned have their horizontal axes located at or substantially at the centre line of the stay and provide a free or clear length of flexible wire intermediate the ends of the stay and the bearing plates.

In the embodiment of the present invention illustrated in Figures 3 and 4 instead of producing the stay from a flat rectangular bar, the body 5 of the stay may be produced as a webbed or flanged casting as indicated by reference numeral 19, the inner half of the flexible wire connection 10 being located and rigidly secured to the ends of the cast stay body in the manner already stated while the outer end of each wire 10 is looped around and anchored to a pin 18 which is incorporated in the bearing plate or other part of the mechanism of the scale or other machine in which the stay is to be incorporated, the arrangement in both formations being such that the central part of each wire is freely or clearly located within a slotted part of the stay and the bearing or other plate cooperative therewith.

The wire is desirably of circular cross-section but may be formed as a cold drawn high tensile flexible wire of other cross-section but excludes a thin flat flexible metallic ribbon or strip as hitherto employed.

I claim:

1. A stay for scales or other lever apparatus comprising, in combination, a bar, a slot provided in at least one end of said bar, a groove extending from said slot on one side of said bar on substantially the center line of the bar, a wire positioned in said groove and extending within said slot and beyond the end of said bar, and a clamping plate cooperating with said grooved portion of said bar rigidly to clamp said wire in said groove.

2. A stay for scales or other lever apparatus comprising, in combination, a bar, a slot provided in at least one end of said bar, a groove extending from said slot on one side of said bar on substantially the center line of the bar, a wire positioned in said groove and extending within said slot and beyond the end of said bar, a clamping plate having a slot therein and a groove extending from said slot, and means for detachably fastening said clamping plate to said bar with the slots in alignment and the grooves in cooperating relation rigidly to clamp said wire in said grooves.

3. A stay for scales or other lever apparatus comprising, in combination, a bar, a slot provided in at least one end of said bar, a groove extending from said slot on one side of said bar on substantially the center line of the bar, there being a hole extending transversely through said bar, a wire positioned in said groove with an end portion thereof located within said hole, said wire extending within said slot and beyond the end of said bar, and a clamping plate detachably connected to said grooved portion of said bar rigidly to clamp said wire in said groove.

4. A stay for scales or other lever apparatus comprising, in combination, a bar, a slot provided in at least one end of said bar, means forming a hole which extends transversely of said bar, a groove extending from said slot on one side of said bar on substantially the center line of the bar, a wire positioned in said groove with an end portion thereof located within said hole, said wire extending within said slot and beyond the end of said bar, a clamping plate provided with a slot therein and a groove extending from said slot, and means for detachably fastening said clamping plate to said bar with said slots in alignment and the grooves in cooperating relation rigidly to clamp said wire in said grooves.

5. A stay connection comprising, in combination, a bearing plate having a slot therein and a groove extending from said slot on one side of said plate, a bar having one end spaced from said bearing plate, said bar having a slot in said end which faces the aforesaid slot on said bearing plate and a groove which extends from said slot on one side of said bar on substantially the center line of the bar, a thin flexible wire extending between said bearing plate and said bar positioned in said grooves and extending within the respective slots of said bearing plate and bar, a first clamping plate provided with a slot and a groove extending therefrom, a second clamping plate provided with a slot and a groove extending therefrom, and separate means for detachably fastening said first and second clamping plates to said bearing plate and to said bar respectively, with the respective slots in alignment and the grooves in cooperating relation rigidly to clamp said wire in said grooves whereby a free length of said flexible wire is positioned intermediate said bearing plate and an end of said bar.

6. A stay connection comprising, in combination, a bearing plate having a slot therein and a groove extending from said slot on one side of said plate, a bar having one end spaced from said bearing plate, said bar having a slot in said end which faces the aforesaid slot on said bearing plate and a groove which extends from said slot on one side of said bar on substantially the center line of the bar, there being a hole extending transversely through said bar, a thin flexible wire extending between said bearing plate and said bar positioned in said grooves and extending within the respective slots of said bearing plate and bar, with one end portion of said wire located within said hole, a first clamping plate provided with a slot and a groove extending therefrom, a second clamping plate provided with a slot and a groove extending therefrom, and separate means for detachably fastening said first and second clamping plates to said bearing plate and to said bar respectively, with the respective slots in alignment and the grooves in cooperating relation rigidly to clamp said wire in said grooves whereby a free length of said flexible wire is positioned intermediate said bearing plate and an end of said bar.

References Cited in the file of this patent

UNITED STATES PATENTS

| | | |
|---|---|---|
| 1,424,239 | Conti | Aug. 1, 1922 |
| 1,491,041 | Herod | Apr. 22, 1924 |
| 1,941,849 | Myers | Jan. 2, 1934 |
| 2,466,724 | Meyer | Apr. 12, 1949 |
| 2,611,663 | Foster | Sept. 23, 1952 |
| 2,621,418 | Schmidt | Dec. 16, 1952 |